United States Patent
Carney

[15] 3,668,207
[45] June 6, 1972

[54] 2-AMINO-4-ARYL-QUINOLINES

[72] Inventor: Richard William James Carney, New Providence, N.J.

[73] Assignee: Ciba-Geigy Corporation, Summit, N.J.

[22] Filed: Jan. 22, 1970

[21] Appl. No.: 5,146

Related U.S. Application Data

[63] Continuation-in-part of Ser. No. 638,594, May 15, 1967, Pat. No. 3,542,785.

[52] U.S. Cl. ............... 260/286 R, 260/247.5 B, 260/268 BQ, 260/268 PH, 260/288 R
[51] Int. Cl. .......................................................... C07d 33/52
[58] Field of Search ................. 260/288, 288 A, 286, 268 BQ

[56] References Cited

UNITED STATES PATENTS

| | | | |
|---|---|---|---|
| 3,575,984 | 4/1971 | Plostinieks | 260/288 R |
| 2,086,691 | 7/1937 | Zerweck et al. | 260/288 |
| 2,652,398 | 9/1953 | Kaye | 260/288 |
| 3,272,824 | 9/1966 | Ebetind | 260/288 |
| 3,435,041 | 3/1969 | Drukker | 260/288 |
| 3,493,570 | 2/1970 | Plostnieks | 260/288 X |

FOREIGN PATENTS OR APPLICATIONS 347,515  4/1931  Great Britain ......................... 260/288

*Primary Examiner*—Donald G. Daus
*Attorney*—Harry Goldsmith, Joseph G. Kolodny and Mario A. Monaco

[57] ABSTRACT

2-Amino-4-aryl-quinolines, e.g. those of the formula

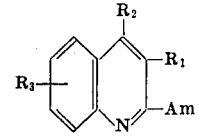

Am = an amino or hydrazino group
$R_1$ = H, aliphatic, araliphatic or aromatic radical
$R_2$ = aromatic radical
$R_3$ = H, alkyl, alkoxy, alkylmercapto, halogeno, $CF_3$, $NO_2$ or amino acyl derivatives, quaternaries and salts thereof, exhibit antiinflammatory effects.

6 Claims, No Drawings

2-AMINO-4-ARYL-QUINOLINES

CROSS-REFERENCES TO RELATES APPLICATIONS

This is a continuation-in-part of application Ser. No 638,594, filed May 15, 1967 (now U.S. Pat. No. 3,542,785).

SUMMARY OF THE INVENTION

The present invention concerns and has for its object the provision of new 2-amino-4-aryl-quinolines, more particularly those of the Formula I

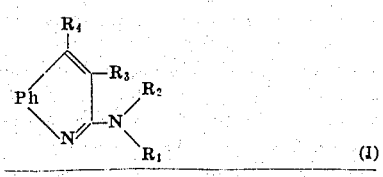

in which Ph is a 1,2-phenylene radical, $R_1$ is hydrogen, amino or an aliphatic hydrocarbon radical, $R_2$ is an aliphatic or araliphatic hydrocarbon radical, $R_3$ is hydrogen, an aliphatic, araliphatic or aromatic radical and $R_4$ is a carbocyclic or heterocyclic, mono- or bi- cyclic aromatic radical, of acyl derivatives, quaternaries and salts thereof, of corresponding pharmaceutical compositions, new starting materials and of methods for the preparation and application of these products. Said compositions are useful antiinflammatory agents, preferably for enteral, e.g. oral application, in the treatment of tissue inflammations, such as arthritic inflammations and similar conditions.

DESCRIPTION OF THE PREFERRED EMBODIMENTS

The 1,2-phenylene radical Ph is unsubstituted or substituted by one or more than one of the same or different substituents attached to any of the positions available for substitution. Such substituents, are, for example, lower alkyl, such as methyl, ethyl, n- or i-propyl or -butyl, etherified hydroxy or mercapto, for example lower alkoxy or alkylmercapto, such as methoxy, ethoxy n- or i-propoxy or -butoxy, methyl- or ethylmercapto, esterified hydroxy, for example halogeno, such as fluoro, chloro or bromo, trifluoromethyl, nitro or amino, for example, di-lower alkylamino, such as dimethylamino or diethylamino. Preferred 1,2-phenylene radicals Ph are 1,2-phenylene, (lower alkyl)-1,2-phenylene, (lower alkoxy)-1,2-phenylene, (lower alkylmercapto)-1,2-phenylene, (halogeno)-1,2-phenylene, (trifluoromethyl)-1,2-phenylene, (nitro)-1,2-phenylene or (di-lower alkylamino)-1,2-phenylene.

An aliphatic radical $R_1$, $R_2$ and/or $R_3$ represents especially lower alkyl, such as methyl, ethyl, n- or i-propyl, -butyl, -pentyl, -hexyl or -heptyl. $R_2$ may also stand for lower alkenyl, such as allyl or methallyl, cycloalkyl or cycloalkyl-lower alkyl having from 3 to 8, especially from 5 to 7, ring-carbon atoms, such as cyclopropyl, cyclopentyl, cyclohexyl, cycloheptyl or cyclooctyl, cyclopropylmethyl, cyclopentylmethyl, 2-cyclopentylethyl, cyclohexylmethyl, 1-cyclohexylethyl or cycloheptylmethyl. An araliphatic radical is preferably monocyclic carbocyclic aryl-lower alkyl, such as benzyl, 1- or 2-phenylethyl. These radicals are unsubstituted or contain additional substituents in the aromatic portion, such as those mentioned for Ph, and/or in the aliphatic portion hydroxy. Such radicals are, for example, hydroxy-lower alkyl, such as 2-hydroxy-ethyl, 2- or 3-hydroxy-propyl, 2-, 3- or 4-hydroxy-butyl.

$R_1$ and $R_2$, when taken together, also represent lower alkylene, aralkylene, aza-, oxa- or thia-alkylene, N-(lower alkyl, hydroxy-lower alkyl or phenyl)-aza-alkylene, in which the hetero atoms are separated from each other by at least 2 carbon atoms, such as 1,2-ethylene, 1,4-butylene, 1,4- or 1,5-pentylene, 3-(methyl or phenyl)-1,5-pentylene, 2,5- or 1,6-hexylene or 2,6-heptylene; 3-aza-1,5-pentylene, 3-(methyl, ethyl, 2-hydroxyethyl or phenyl)-3-aza-1,5-pentylene, 3-(oxa or thia)-1,5-pentylene.

An aromatic radical $R_3$ and/or $R_4$ and that present in the above araliphatic radical, particularly stands for mono- or bicyclic carbocyclic aryl, i.e. phenyl, 1- or 2-naphthyl, or monocyclic heterocyclic aryl, such as furyl, thienyl or pyridyl. Said aryl groups are unsubstituted or contain one or more than one of the same or different substituents attached to any position available for substitution, for example those mentioned for Ph. They primarily stand for phenyl, (lower alkyl)-phenyl, (lower alkoxy)-phenyl, (lower alkylmercapto)-phenyl, (halogeno)-phenyl, (trifluoromethyl)-phenyl, (nitro)-phenyl, (di-lower alkylamino)-phenyl, pyridyl, (lower alkyl)-pyridyl, furyl, (lower alkyl)-furyl, thienyl or (lower alkyl)-thienyl.

The acyl derivatives of the invention are particularly those of carboxylic acids, preferably of aliphatic, araliphatic or aromatic carboxylic acids, such as those mentioned below, especially of lower alkanoic acids, such as acetic, propionic, butyric or pivalic acid. The quaternaries of the invention are preferably the lower alkyl or aralkyl quaternaries.

The compounds of this invention exhibit valuable pharmacological properties. Apart from diuretic effects, they exhibit primarily antiinflammatory activity, as can be demonstrated in animal tests using, for example mammals, such as rats or dogs, as test objects. Such tests can be performed either according to Renzi et al., Tox. & Appl. Pharmacol. 1, 406 (1959) for diuresis or according to Winter et al, Proc. Soc. Exp. Biol. & Med. 111, 544 (1962) for antiinflammatory effects. The compounds of the invention can be applied enterally or parenterally, e.g. orally by stomach tube, advantageously in the form of aqueous solutions or suspensions (which may contain carboxymethylcellulose and polyethylene glycol as solubilizers), in the dosage range between about 1 and 75 mg/kg/day, preferably between about 5 and 50 mg/kg/day, advantageously between about 10 and 25 mg/kg/day. In view of the test results obtained, the compounds of the invention are valuable diuretics or antiphlogistics, advantageously in the treatment or management of arthritic or dermatopathologic conditions. They are also useful intermediates in the preparation of other valuable products, particularly of pharmacologically active compounds. Thus the corresponding 2-amino-4-aryl-3,4-dihydro-quinolines, disclosed in copending application Ser. No. 638,593 filed May 15, 1967 (now U.S. Pat. No. 3,538,101) are obtained from the compounds of this invention by hydrogenation.

Particularly useful are the compounds of Formula I in which Ph is 1,2-phenylene, (lower alkyl)-1,2-phenylene, (lower alkoxy)-1,2-phenylene or (halogeno)-1,2-phenylene, $R_1$ is hydrogen or lower alkyl, $R_2$ is lower alkyl, lower alkenyl, cycloalkyl or cycloalkylalkyl with three to six ring- and one to four chain-carbon atoms, hydroxy-lower alkyl or $R_5$-lower alkyl, or $R_1$ and $R_2$ together represent lower alkylene, $R_5$-lower alkylene, aza-, oxa- or thia-lower alkylene or N-(lower alkyl or hydroxy-lower alkyl)-aza-lower alkylene, wherein the heteroatoms are separated from each other by at least 2 carbon atoms, $R_3$ is hydrogen, lower alkyl or $R_6$ and each of $R_4$, $R_5$ and $R_6$ is phenyl, (lower alkyl)-phenyl, (lower alkoxy)-phenyl or (halogeno)-phenyl, or therapeutically useful acid addition salts thereof.

Especially mentioned are the compounds of Formula II in which $R_7$ is hydrogen methyl or ethyl, $R_8$ is methyl, ethyl, n-propyl, i-butyl, allyl, cyclopropyl, cyclopropylmethyl, 2-hydroxyethyl, benzyl, 4-fluoro-benzyl or 2-pyridylmethyl, or $R_7$ and $R_8$ together represent 1,4-butylene, 1,5-pentylene, 3-phenyl-1,5-pentylene, 1,6-hexylene, 3-(methyl or phenyl)-3-aza-1,5-pentylene or 3-oxa-1,5-pentylene, $R_9$ is hydrogen, methyl or phenyl, $R_{10}$ is phenyl or 4-methoxy-phenyl and $R_{11}$ is hydrogen or chloro, or therapeutically useful acid addition salts thereof which, when given orally to rats at doses between about 5 and 50 mg/kg/day, preferably between about 10 and 25 mg/kg/day, show outstanding antiinflammatory effects according to the granuloma pouch or carrageenin paw test.

The compounds of this invention are prepared according to known methods, for example, by:

a. reacting a 2-hydroxy- or mercapto-4-aryl-quinoline, more particularly such of the Formula III

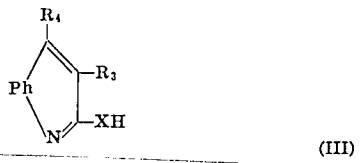

(III)

in which X stands for oxygen or sulfur, or preferably a reactive ester or ether thereof, with a primary or secondary amine, preferably that of the formula $R_1$—NF—$R_2$, or b. dehydrogenating a 2-amino-4-aryl-3,4-dihydro-quinoline, more particularly such of the Formula IV

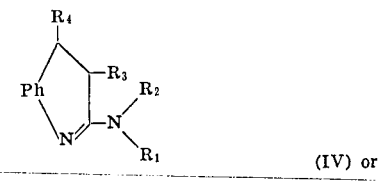

(IV) or c. condensing an N-(2-aroyl-phenyl)-alkanoic or aralkanoic acid amidine, more particularly such of the Formula V

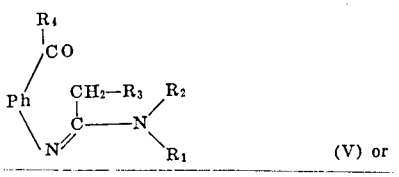

(V) or d. condensing a 2-amino-β-aryl-cinnamic acid amide or nitrile, more particularly such of the Formula VI

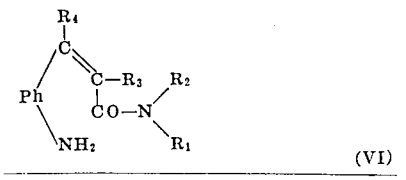

(VI)

and, if desired, converting any compound obtained into another disclosed compound.

A reactive ester of the 2-hydroxy-4-aryl-quinoline, more particularly is such of a hydrohalic or sulfonic acid, such as hydrochloric, hydrobromic, methane-, ethane-, benzene- or p-toluenesulfonic acid. A corresponding ether is preferably a lower alkyl or aralkyl ether. The dehydrogenation mentioned under item (b) is preferably carried out with catalysts, e.g. palladium catalysts, or oxidation agents, such as potassium ferricyanide. In the reaction according to (a), (c) or (d) any water, alcohol or mercaptan formed may either be distilled off azeotropically or absorbed by a condensing agent, such as a carbodiimid.

The compounds obtained according to said process may be converted into other disclosed compounds by methods in themselves known. Thus, for example, into any primary, secondary or tertiary nitrogen atom, for example into compounds of Formula I in which $R_1$ stands for hydrogen, a substituent may be introduced, if necessary, after conversion of the compound obtained into a metal, e.g. alkali metal, derivative thereof. This can be done, for example, by reaction with a reactive ester of an appropriate alcohol, for example, that of a hydrohalic or sulfonic acid, e.g. those mentioned above, or by reductive alkylation, i.e. reaction with an appropriate oxocompound and subsequent or simultaneous reduction, or with an acid halide or anhydride, whereby acyl derivatives, higher substituted amines or hydrazines, or quaternaries are obtained. In compounds amino-substituted by α-arylalkyl, e.g. benzyl or acyl, e.g. acetyl or phthaloyl radicals, the said radicals can be split off in the usual manner by hydrogenolysis, hydrolysis or hydrazinolysis.

The above-mentioned reactions are carried out according to standard methods, in the presence or absence of diluents, preferably such as are inert to the reagents and are solvents thereof, of catalysts, condensing agents and/or inert atmospheres, at low temperatures, room temperature or elevated temperatures, at atmospheric or superatmospheric pressure. Condensing agents are especially used in the reaction with said reactive esters in order to eliminate the acid formed. They are basic agents, for example, alkali or alkaline earth metal carbonates or lower alkoxides, or more especially, organic bases such as pyridine or collidine, but particularly aliphatic tertiary amines, such as tri-lower alkylamines, e.g. triethylamine.

The compounds of the invention are obtained in the free form or in the form of their salts, depending on the conditions under which the process is carried out. Salts that are obtained can be converted into the free bases in known manner, for example, with alkalis or ion exchangers. Free bases that are obtained can be converted into salts by reaction with inorganic or organic acids, especially those that are suitable for the formation of therapeutically useful salts. Such acids are, for example, hydrohalic acids, e.g. hydrochloric, hydrobromic, sulfuric, phosphoric, nitric or perchloric acid, aliphatic, alicyclic, araliphatic, aromatic, or heterocyclic carboxylic or sulfonic acids, for example, formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxybenzoic, salicyclic, aminosalicyclic, embonic, nicotinic, methanesulfonic, ethanesulfonic, toluenesulfonic, naphthalenesulfonic and sulfanilic acid; methionine, tryptophan, lysine and arginine.

These or other salts, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate obtainable at any stage of the process is used as starting material and any remaining steps are carried out, or the process is discontinued at any stage thereof, or in which the starting materials are formed under the reaction conditions, or in which the reaction components are used in the form of their salts. Mainly, those starting materials should be used in the reaction of the invention that lead to the formation of those compounds indicated above as being specially valuable.

The starting material used in reaction (a) is prepared by condensation of N-alkanoyl or aralkanoyl-2-aroyl-anilines or their thioderivitives and, if desired, esterification or etherification of the resulting 2-hydroxy- or mercapto-4-aryl-quinoline in the customary manner, for example with the use of phosphorus halogenides or sulfonic acid halides, or reactive esters of alcohols, such as alkyl halogenides or sulfates. The starting material mentioned under item (b) is disclosed in U.S. Pat. No. 3,538,101. It can be prepared analogous to reaction (c) from the alcohol corresponding to Formula V or its reactive esters or ethers, or reaction (d) from the saturated acid amide corresponding to Formula VI. The starting material mentioned under item (c) can be prepared from the corresponding alkanoic or aralkanoic acid amide and the 2-arolyaniline in the presence of a condensing agent, e.g.

phosphorus trichloride. The starting material used in reaction (d) can be prepared by amidation of the corresponding acids, advantageously, their esters or halides.

The pharmacologically active compounds of the invention are useful in the manufacture of pharmaceutical compositions containing an effective amount thereof in conjunction or admixture with excipients suitable for either enteral, parenteral or topical application. Preferred are tablets and gelatin capsules comprising the active ingredient together with (a) diluents, e.g. lactose, dextrose, sucrose, mannitol, sorbitol, cellulose and/or glycine, (b) lubricants, e.g. silica, talcum, stearic acid, its magnesium or calcium salt and/or polyethyleneglycol, for tablets also (c) binders, e.g. magnesium aluminum silicate, starch paste, gelatin, tragacanth, methylcellulose, sodium carboxymethylcellulose and/or polyvinylpyrrolidone, if desired, (d) disintegrants, e.g. starches, agar, alginic acid or its sodium salt, enzymes of the binders or effervescent mixtures and/or (e) adsorbents, colorants, flavors and sweeteners. Injectable compositions are preferably aqueous isotonic solutions or suspensions, and suppositories or ointments are advantageously fatty emulsions or suspensions. They may be sterilized and/or contain adjuvants, such as preserving, stabilizing, wetting or emulsifying agents, solution promoters, salts for regulating the osmotic pressure and/or buffers. Said pharmaceutical compositions may also contain other therapeutically valuable substances. They are prepared according to conventional mixing, granulating or coating methods respectively and contain about 0.1 to 75 percent, preferably about 1 to 50 percent, of the active ingredient.

The following examples are intended to illustrate the invention and are not to be construed as being limitations thereon. Temperatures are given in degrees centigrade, and all parts wherever given are parts by weight.

EXAMPLE 1

The mixture of 2.5 g 2,6-dichloro-4-phenyl-quinoline and 7.5 ml dimethylamine is heated in a sealed tube to 150° for 6 hours. It is then evaporated, the residue taken up in water, the mixture extracted with chloroform, the extract dried, filtered and evaporated in vacuo. The residue is recrystallized from ethanol to yield the 2-dimethylamino-4-phenyl-6-chloro-quinoline of the formula

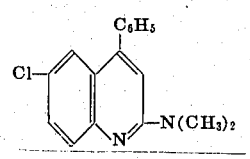

melting at 100°–102°.

The starting material is prepared as follows: The mixture of 30.0 g 2-amino-5-chloro-benzophenone, 10.1 g acetylchloride, 13.0 g triethylamine and 250 ml benzene, is refluxed for 1 hour while stirring. After cooling it is filtered, the residue washed with benzene, the filtrate evaporated in vacuo and the residue taken up in water. The mixture is extracted with diethyl ether, the extract washed with diluted hydrochloric acid, dried, filtered and evaporated. The residue is recrystallized from diethyl ether and ethanol to yield the 2-acetylamino-5-chloro-benzophenone melting at 114°–117°.

The mixture of 6.0 g thereof, 1.0 g sodium hydroxide, 5 ml water and 250 ml ethanol, is refluxed for 30 minutes and then evaporated in vacuo. The residue is taken up in water, the mixture extracted with chloroform, the extract dried, filtered and evaporated. The residue is recrystallized from ethanol to yield the 2-hydroxy-4-phenyl-6-chloro-quinoline melting at 259°–261°.

The mixture of 3.2 g thereof and 25 ml phosphorus oxychloride is refluxed for 2 hours. After cooling, it is added dropwise to an excess of ice water while stirring. The mixture is extracted with chloroform, the extract dried, filtered and evaporated. The residue is recrystallized from ethanol to yield the 2,6-dichloro-4-phenyl-quinoline, melting at 113°–115°.

EXAMPLE 2

The mixture of 6.0 g 2,6-dichloro-3-methyl-4-phenylquinoline and 9.5 ml dimethylamine is heated in a sealed tube to 135° for 2 days. It is evaporated, the residue taken up in water, the mixture extracted with diethyl ether, the extract washed with water, dried, filtered and evaporated. The residue is recrystallized from hexane to yield the 2-dimethylamino-3-methyl-4-phenyl-6-chloro-quinoline of the formula

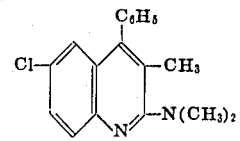

melting at 89°–91°.

The starting material is prepared as follows: The stirred mixture of 50 g 2-amino-5-chloro-benzophenone, 100 ml propionic acid anhydride, 0.1 g sodium acetate and 300 ml benzene is refluxed for 2 hours. After cooling 100 ml water are added dropwise while stirring. The organic layer is separated, evaporated, the residue taken up in the solution of 34 g sodium hydroxide in 50 ml water and 500 ml ethanol and the mixture refluxed for 1 hour while stirring. It is then concentrated, the aqueous concentrate filtered, the residue washed with water and triturated with 400 ml of 6N hydrochloric acid for 5 minutes. It is filtered off, washed with water, dissolved in chloroform, the solution treated with charcoal, filtered and evaporated. The residue is triturated with methanol and recrystallized from methanol, to yield the 2-hydroxy-3-methyl-4-phenyl-6-chloro-quinoline melting at 257°–260°.

The mixture of 5.0 g thereof and 35 ml phosphorus oxychloride is refluxed for 2 hours. After cooling, it is added dropwise to an excess of ice water while stirring. The mixture is extracted with chloroform, the extract dried, filtered and evaporated. The residue is recrystallized from methanol to yield the 2,6-dichloro-3-methyl-4-phenyl-quinoline, melting at 182°–184°.

EXAMPLE 3

The mixture of 1.5 g 2,6-dichloro-3,4-diphenyl-quinoline and 7.5 ml dimethylamine is heated in a sealed tube to 150° for 6 hours. It is then evaporated, the residue taken up in water, the mixture extracted with chloroform, the extract dried, filtered and evaporated in vacuo. The residue is recrystallized from hexane-benzene, to yield the 2-dimethylamino-3,4-diphenyl-6-chloroquinoline of the formula

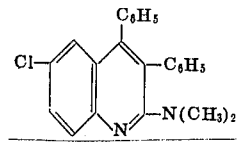

melting at 177°–179°.

The starting material is prepared as follows: To the stirred mixture of 50 g 2-amino-5-chloro-benzophenone, 300 ml benzene, 0.1 g sodium acetate and 22 g triethylamine, the solution of 88 g phenylacetyl chloride in 50 ml benzene is added dropwise. Hereupon the mixture is refluxed for 2 ½ hours and allowed to stand overnight at room temperature. One hundred milliliters water are added dropwise while stirring, and the mixture again kept overnight. The organic layer is separated and evaporated in vacuo. To the residue the solution of 34 g sodium hydroxide in 50 ml water and 500 ml ethanol is added and the mixture refluxed for 1 hour. It is evaporated, the residue washed with water and triturated with 700 ml hot 20 percent aqueous sodium hydroxide and then with 500 ml 6N hydrochloric acid. The solid is filtered off, washed with water, dissolved in chloroform, the solution treated with charcoal, filtered and evaporated. The residue is recrystallized from methanol to yield the 2-hydroxy-3,4-diphenyl-6-chloroquinoline melting at 302°–305°.

The mixture of 14 g thereof and 100 ml phosphorus oxychloride is refluxed for 2 hours. After cooling, it is added dropwise to an excess of ice water while stirring. The mixture is extracted with chloroform, the extract dried, filtered and evaporated. The residue is recrystallized from benzene-hexane to yield the 2,6-dichloro-3,4-diphenyl-quinoline melting at 176°–177°.

EXAMPLE 4

In the manner described in the previous examples, the following compounds of Formula II are prepared from equivalent amounts of the corresponding starting materials of Formula III:

| $R_7+R_8$ | $R_9$ | $R_{10}$ | $R_{11}$ | M.P. |
|---|---|---|---|---|

| $R_7+R_8$ | $R_9$ | $R_{10}$ | $R_{11}$ | M.P. |
|---|---|---|---|---|
| H+NH$_2$ | C$_6$H$_5$ | 4-CH$_3$O—C$_6$H$_4$ | H | 218–221° |
| H+CH$_3$ | C$_6$H$_5$ | 4-CH$_3$O—C$_6$H$_4$ | H | 175–178° |
| H+nC$_3$H$_7$ | H | C$_6$H$_5$ | Cl | 110–112° |
| H+nC$_3$H$_7$ | C$_6$H$_5$ | C$_6$H$_5$ | Cl | 149–151° |
| H+CH$_2$—CH (CH$_3$)$_2$ | H | C$_6$H$_5$ | Cl | 136–138° |
| H+▲ | H | C$_6$H$_5$ | Cl | 165–167° |
| H+▲—CH$_2$ | H | C$_6$H$_5$ | Cl | 138–140° |
| H+4-F—C$_6$H$_4$—CH$_2$ | C$_6$H$_5$ | C$_6$H$_5$ | Cl | 203–205° |
| H+HO—CH$_2$—CH$_2$ | H | C$_6$H$_5$ | Cl | 146–149° |
| H+HO—CH$_2$—CH$_2$ | C$_6$H$_5$ | C$_6$H$_5$ | Cl | 170–173° |
| H+HO—CH$_2$—CH$_2$ | CH$_3$ | C$_6$H$_5$ | Cl | 171–174° |
| H+⟨N⟩—CH$_2$ | H | C$_6$H$_5$ | Cl | 115–118° |
| CH$_3$+CH$_3$ | H | 4-CH$_3$O—C$_6$H$_4$ | H | 142–145° |
| CH$_3$+CH$_3$ | C$_6$H$_5$ | 4-CH$_3$O—C$_6$H$_4$ | H | 155–158° |
| CH$_3$+CH$_3$ | H | C$_6$H$_5$ | H | 115–119° |
| CH$_3$+CH$_3$ | CH$_3$ | C$_6$H$_5$ | H | 75–79° |
| CH$_3$+CH$_2$=CH—CH$_2$ | H | C$_6$H$_5$ | Cl | 66–68° |
| CH$_3$+CH$_2$=CH—CH$_2$ | CH$_3$ | C$_6$H$_5$ | Cl | 83–85° |
| CH$_3$+CH$_2$=CH—CH$_2$ | C$_6$H$_5$ | C$_6$H$_5$ | Cl | 153–155° |
| CH$_3$+C$_6$H$_5$—CH$_2$ | C$_6$H$_5$ | C$_6$H$_5$ | Cl | 150–152° |
| CH$_3$+C$_6$H$_5$—CH$_2$ | H | C$_6$H$_5$ | Cl | 120–122° |
| CH$_3$+HO—CH$_2$—CH$_2$ | H | C$_6$H$_5$ | Cl | 114–115° |
| CH$_3$+HO—CH$_2$—CH$_2$ | CH$_3$ | C$_6$H$_5$ | Cl | 125–127° |
| CH$_3$+HO—CH$_2$—CH$_2$ | C$_6$H$_5$ | C$_6$H$_5$ | Cl | 147–150° |
| 1,5-pentylene | H | C$_6$H$_5$ | Cl | 128–130° |
| Do | CH$_3$ | C$_6$H$_5$ | Cl | 143–145° |
| Do | C$_6$H$_5$ | C$_6$H$_5$ | Cl | 240–242° |
| 1,6-hexylene | H | C$_6$H$_5$ | Cl | 129–131° |
| Do | CH$_3$ | C$_6$H$_5$ | Cl | 92–94° |
| Do | C$_6$H$_5$ | C$_6$H$_5$ | Cl | 185–188° |
| C$_2$H$_4$—O—C$_2$H$_4$ | H | C$_6$H$_5$ | Cl | 120–122° |
| Do | CH$_3$ | C$_6$H$_5$ | Cl | 155–157° |
| Do | C$_6$H$_5$ | C$_6$H$_5$ | Cl | 229–231° |
| CH$_3$<br>\|<br>C$_2$H$_4$—N—C$_2$H$_4$ | H | C$_6$H$_5$ | Cl | 94–96° |
| Same as above | CH$_3$ | C$_6$H$_5$ | Cl | 175–177° |
| Do | C$_6$H$_5$ | C$_6$H$_5$ | Cl | 227–229° |
| C$_6$H$_5$<br>\|<br>C$_2$H$_4$—CH—C$_2$—H$_4$ | H | C$_6$H$_5$ | Cl | 163–165° |

The starting materials of the formula

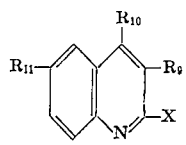

are listed below:

| X | $R_9$ | $R_{10}$ | $R_{11}$ | M.P. |
|---|---|---|---|---|
| OH | C$_6$H$_5$ | 4-CH$_3$O—C$_6$H$_4$ | H | 308–311° |
| Cl | C$_6$H$_5$ | 4-CH$_3$O—C$_6$H$_5$ | H | 160–163° |
| Cl | C$_6$H$_5$ | C$_6$H$_5$ | H | 305–308° |
| Cl | C$_6$H$_5$ | C$_6$H$_5$ | H | 165–167° |
| OH | H | 4-CH$_3$O—C$_6$H$_4$ | H | 235–237° |
| Cl | H | 4-CH$_3$O—C$_6$H$_4$ | H | 154–158° |
| OH | H | C$_6$H$_5$ | H | 259–262° |
| Cl | H | C$_6$H$_5$ | H | 85–87° |
| OH | CH$_3$ | C$_6$H$_5$ | H | 231–235° |
| Cl | CH$_3$ | C$_6$H$_5$ | H | 115–118° |

EXAMPLE 5

Preparation of 1000 tablets each containing 50 mg of the active ingredient:

Formula:
| | |
|---|---|
| 2-dimethylamino-4-phenyl-6-chloro-quinoline | 50.0 g |
| Colloidal silica | 2.5 g |
| Corn starch | 7.5 g |
| Magnesium stearate | 1.0 g |
| Lactose | 89.0 g |
| Ethanol (anhydrous) | q.s. |
| Purified water | q.s. |

Procedure:

The lactose and the drug substance are passed through a comminuting machine using a screen with 1.2 mm openings. The stearate, starch and silica, previously mixed with a small portion of the lactose, are added to the sieved powders, which are mixed at low speed for 30 minutes. They are then granulated with ethanol-water (1:1) until suitable granules are formed. The granulate is passed through a comminuting machine (knives forward) using a screen with 4.0 mm openings. The granulate is dried at 49° to a moisture content below 2 percent, again passed through a comminuting machine (knives forward) using a screen with 1.4 mm openings and compressed into 150 mg tablets using standard concave punches with 7.1 mm diameter.

In the analogous manner tablets are prepared, each containing 50 mg of the 2-cyclopropylamino- or 2-piperidino-6-chloro-4-phenyl-quinoline.

EXAMPLE 6

Preparation of 10,000 tablets each containing 50 mg of the active ingredient:

Formula:
| | |
|---|---|
| 2-dimethylamino-4-(4-methoxy-phenyl)-quinoline | 500.0 g |
| Lactose | 1,706.0 g |
| Corn starch | 90.0 g |
| Polyethylene glycol 6,000 | 90.0 g |
| Talcum powder | 90.0 g |
| Magnesium stearate | 24.0 g |
| Purified water | q.s. |

Procedure:

All the powders are passed through a screen with an opining of 0.6 mm. Then the drug substance, lactose, talcum, magnesium stearate and half of the starch are mixed in a suitable mixer. The other half of the starch is suspended in 50 ml water and the suspension added to the boiling solution of the polyethylene glycol in 50 ml water. The paste formed is added to the powders which are granulated, if necessary, with an additional amount of water. The granulate is dried overnight at 35°, broken on a screen with 1.2 mm openings and compressed into tablets using concave punches with 7.1 mm diameter, uppers bisected.

EXAMPLE 7

The mixture of 1.0 g 2,6-dichloro-4-phenyl-quinoline and 2.0 g 4-fluorobenzylamine is heated in a sealed tube to 150° for 4 hours. It is evaporated in vacuo, the residue taken up in diethyl ether, the solution washed with water, dried and filtered. The filtrate is acidified with ethereal hydrochloric acid, the precipitate formed filtered off and recrystallized from ethanol-methanol to yield the 2-(4-fluoro-benzyl)-4-phenyl-6-chloroquinoline hydrochloride of the formula

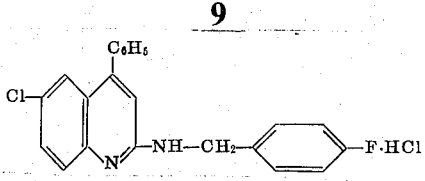

melting at 274°–276°.

EXAMPLE 8

According to the method described in the previous examples, the following compounds of Formula II are prepared from equivalent amounts of the corresponding starting materials $R_{10}$ = phenyl:

| $R_7+R_8$ | $R_9$ | $R_{11}$ | M.P. |
|---|---|---|---|
| H+ △ | $C_6H_5$ | H | 185–187° |
| Same as above | $C_6H_5$ | Cl | 175–177° |
| Do | $CH_3$ | Cl | 158–159° |
| Do | 4-$CH_3O$—$C_6H_4$ | Cl | 220–222° |
| $CH_3+CH_3$ | 4-$CH_3O$—$C_6H_4$ | Cl | 197–200° |
| H+$CH_2$—$CH(CH_3)_2$ | 4-$CH_3O$—$C_6H_4$ | Cl | 164–166° |
| 1,6-hexylene | 4-$CH_3O$—$C_6H_4$ | Cl | 130–132° |
| H+n$C_3H_7$ | $CH_3$ | Cl | 111–113° |
| H+$CH_2$—$CH(CH_3)_2$ | $CH_3$ | Cl | 133–135° |
| H+$CH_2$—$CH(CH_3)_2$ | $C_6H_5$ | Cl | 160–162° |
| $C_6H_5$ \| $C_2H_4$—N—$C_2H_4$ | H | Cl | 165–167° |
| $C_2H_5+C_2H_5$ | H | Cl | *225–226° |

*HCl.

The above hydrochloride is prepared by acidifying a concentrated solution of the base with ethanolic hydrogen chloride.

Most preferred compounds of the invention are those of Formula II, wherein $R_7$ is hydrogen or methyl, $R_8$ is methyl, ethyl, n-propyl, i-butyl, cyclopropyl or 2-hydroxyethyl, or $R_7$ and $R_8$ together represent 1,5-pentylene, 1,6-hexylene or 3-phenyl-3-aza-1,5-pentylene, $R_9$ is hydrogen or methyl, $R_{10}$ is phenyl or 4-methoxyphenyl and $R_{11}$ is hydrogen or chlorine, or therapeutically useful acid addition salts thereof.

I claim:
1. A compound having the formula

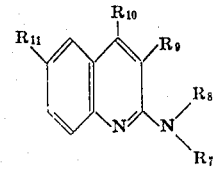

in which $R_7$ is hydrogen, methyl or ethyl, $R_8$ is methyl, ethyl, n-propyl, i-butyl, allyl, cyclopropyl, cyclopropylmethyl, 2-hydroxy-ethyl, benzyl, 4-fluoro-benzyl or 2-pyridylmethyl, or $R_7$ and $R_8$ together are 1,4-butylene, 1,5-pentylene, 3-phenyl-1,5-pentylene, 1,6-hexylene, 3-methyl-3-aza-1,5-pentylene, 3-phenyl-3-aza-1,5-pentylene or 3-oxa-1,5-pentylene, $R_9$ is hydrogen, methyl or phenyl, $R_{10}$ is phenyl or 4-methoxy-phenyl and $R_{11}$ is hydrogen or chloro, or a therapeutically useful acid addition salt thereof.

2. A compound as claimed in claim 1, in which formula $R_7$ is hydrogen or methyl, $R_8$ is methyl, ethyl, n-propyl, i-butyl, cyclopropyl or 2-hydroxyethyl, or $R_7$ and $R_8$ together are 1,5-pentylene, 1,6-hexylene or 3-phenyl-3-aza-1,5-pentylene, $R_9$ is hydrogen or methyl, $R_{10}$ is phenyl or 4-methoxyphenyl and $R_{11}$ is hydrogen or chlorine, or a therapeutically useful acid addition salt thereof.

3. A compound as claimed in claim 1 and being the 2-dimethylamino-4-phenyl-6-chloro-quinoline or a therapeutically useful acid addition salt thereof.

4. A compound as claimed in claim 1 and being the 2-cyclopropylamino-4-phenyl-6-chloro-quinoline or a therapeutically useful acid addition salt thereof.

5. A compound as claimed in claim 1 and being the 2-piperidino-3-methyl-4-phenyl-6-chloro-quinoline or a therapeutically acceptable acid addition salt thereof.

6. A compound as claimed in claim 1 and being the 2-dimethylamino-4-(4-methoxy-phenyl)-quinoline or a therapeutically useful acid addition salt thereof.

* * * * *